United States Patent
Ho

(10) Patent No.: US 9,692,618 B2
(45) Date of Patent: Jun. 27, 2017

(54) PIPELINE MULTIPLEXER LOOP ARCHITECTURE FOR DECISION FEEDBACK EQUALIZER CIRCUITS

(71) Applicant: HUAWEI TECHNOLOGIES CO., LTD., Shenzhen (CN)

(72) Inventor: Huong Ho, Woodlawn (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/870,340

(22) Filed: Sep. 30, 2015

(65) Prior Publication Data

US 2017/0093601 A1    Mar. 30, 2017

(51) Int. Cl.
    *H04L 25/03*    (2006.01)
(52) U.S. Cl.
    CPC ............... *H04L 25/03057* (2013.01)
(58) Field of Classification Search
    CPC ......... H04L 25/03006; H04L 25/03012; H04L 25/03038; H04L 25/03057; H04L 25/03076
    See application file for complete search history.

(56) References Cited

U.S. PATENT DOCUMENTS

| | | | |
|---|---|---|---|
| 7,333,580 B2 | 2/2008 | Parhi | |
| 8,165,247 B1 * | 4/2012 | Madden | G11B 20/10268 375/317 |
| 8,837,571 B1 | 9/2014 | Ke et al. | |
| 9,130,797 B1 * | 9/2015 | Palusa | H04L 25/03878 |
| 9,197,458 B1 * | 11/2015 | Malhotra | H04L 25/03057 |
| 2005/0111539 A1 | 5/2005 | Tsuchiya | |
| 2007/0030891 A1 | 2/2007 | Franz | |

(Continued)

FOREIGN PATENT DOCUMENTS

| CN | 1619960 A | 5/2005 |
|---|---|---|
| CN | 1909422 A | 2/2007 |
| CN | 104348681 A1 | 2/2015 |

OTHER PUBLICATIONS

K. K. Parhi, "Pipelining in Algorithms with Quantizer Loops," IEEE Trans. on Circuits and Systems, 38(7), pp. 745-754, Jul. 1991.

(Continued)

*Primary Examiner* — David B. Lugo
(74) *Attorney, Agent, or Firm* — Norton Rose Fulbright Canada LLP

(57) ABSTRACT

Circuits, devices, methods for decision feedback equalization are described. A decision feedback circuit can include L N-tap decision feedback equalizer (DFE) branches. The L N-tap DFE branches can include K unrolled DFE branches, and L–K unfolded DFE branches. Each DFE branch can include a pre-computation stage configured to generate a set of tap-adjusted inputs, each tap-adjusted input corresponding to a possible value for at least one previous output of the same DFE branch. Each unrolled DFE branch can include a multiplexer circuit having selection lines for selecting from the set of tap-adjusted inputs for the unrolled DFE branch, the selection lines being connected to outputs of other DFE branches. Each unfolded DFE branch can include a multiplexer circuit configured to select at least one output from the set of tap-adjusted inputs based on tap-adjusted inputs from other DFE branches.

23 Claims, 17 Drawing Sheets

(56) References Cited

U.S. PATENT DOCUMENTS

| | | |
|---|---|---|
| 2008/0069198 A1 | 3/2008 | Bhoja et al. |
| 2008/0187036 A1 | 8/2008 | Park et al. |
| 2013/0243107 A1* | 9/2013 | Chmelar .......... H04L 25/03057 375/259 |
| 2014/0024327 A1 | 1/2014 | Parikh |
| 2015/0256363 A1* | 9/2015 | Shvydun .......... H04L 25/03057 375/233 |

OTHER PUBLICATIONS

K. K. Parhi, "Pipelining of Parallel Multiplexer Loops and Decision Feedback Equalizers," Proc. of the ICASSP 2004, pp. V-21-V-24, 2004.

* cited by examiner

PIPELINE MULTIPLEXER LOOP ARCHITECTURE FOR DECISION FEEDBACK EQUALIZER CIRCUITS

FIELD

This disclosure relates generally to the field of electronic signal processing circuits, and more particularly to decision feedback circuits.

BACKGROUND

Equalization techniques can be used to improve signal quality or correct digital signals. In digital feedback loops, loop unrolling is a technique that pre-calculates all possible combinations of filter multiplications and additions in advance of selecting an output based on previous outputs. For a parallel circuit, the output of each branch must be valid within a single clock period, so as the number of parallel branches increases, the speed of the unrolled loops may be limited.

In loop unfolding, L levels of look-ahead expansion are performed on the unrolled architecture to create a parallel architecture. As the number of levels L increases, the resulting size of the parallel architecture and associated delays can be large and may also limit speed.

Smaller and faster decision feedback circuits would be beneficial.

SUMMARY

In accordance with one aspect, there is provided a decision feedback circuit including L N-tap decision feedback equalizer (DFE) branches. The L N-tap DFE branches include K unrolled DFE branches, and L–K unfolded DFE branches. Each DFE branch includes a pre-computation stage configured to generate a set of tap-adjusted inputs, each tap-adjusted input corresponding to a possible value for at least one previous output of the same DFE branch. Each unrolled DFE branch includes a multiplexer circuit having selection lines for selecting from the set of tap-adjusted inputs for the unrolled DFE branch, the selection lines being connected to outputs of other DFE branches. Each unfolded DFE branch includes a multiplexer circuit configured to select at least one output from the set of tap-adjusted inputs based on tap-adjusted inputs from other DFE branches.

In accordance with another aspect, there is provided a method for decision feedback equalization. The method includes: generating a set of tap-adjusted inputs for each of a plurality of decision feedback equalizer (DFE) branches in a decision feedback circuit including a plurality of unrolled DFE branches and a set of one or more unfolded DFE branches; and selecting at least one output from the set of tap-adjusted inputs for at least one unfolded branch in the set of unfolded DFE branches based on an output of at least one of at least one of the plurality of unrolled DFE branches.

In accordance with another aspect, there is provided an electronic device. The electronic device includes: L N-tap decision feedback equalizer (DFE) branches including: K unrolled DFE branches, and L–K unfolded DFE branches. Each DFE branch includes a pre-computation stage configured to generate a set of tap-adjusted inputs, each tap-adjusted input corresponding to a possible value for at least one previous output of the same DFE branch. Each unrolled DFE branch includes a multiplexer circuit having selection lines for selecting from the set of tap-adjusted inputs for the unrolled DFE branch, the selection lines being connected to outputs of other DFE branches. Each unfolded DFE branch includes a multiplexer circuit configured to select at least one output from the set of tap-adjusted inputs based on tap-adjusted inputs from other DFE branches.

Many further features and combinations thereof concerning the present improvements will appear to those skilled in the art following a reading of the instant disclosure.

DESCRIPTION OF THE FIGURES

Embodiments will now be described, by way of example only, with reference to the attached figures, wherein.

These drawings depict aspects of example embodiments for illustrative purposes, and variations, alternative configurations, alternative components and/or modifications may be made to these example embodiments.

DETAILED DESCRIPTION

The present disclosure relates generally to circuits, methods and devices for decision feedback equalization. Embodiments of the present disclosure may, in some examples, result in a potentially smaller, faster and/or lower power multiplexer loop architecture. In some examples, the application of multiplexer loop architectures described herein may allow for greater parallelization, higher clock speeds, and/or higher throughputs in parallel processing decision feedback circuits.

Figure 1:
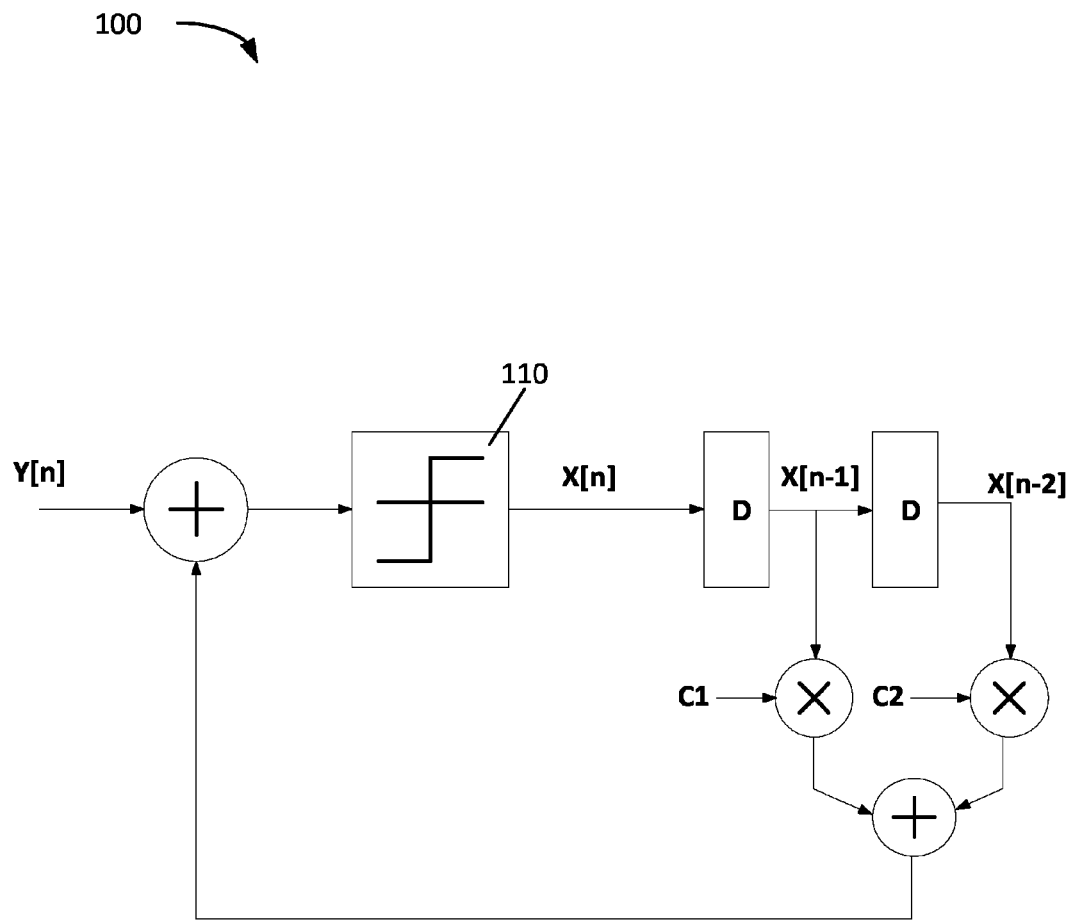
FIGS. 1, 2A and 2B are schematic diagrams of example 2-Tap DFE circuits with feedback.

FIG. 1 shows an example circuit 100 illustrating a serial 2-Tap decision feedback equalizer (DFE) filter with a feedback loop where the output X[n] is based on the quantized value of the input Y[n] as adjusted by the previous two output values X[n−1], X[n−2] multiplied by tap coefficients C1 and C2 respectively. In this example, the quantizer 110 (sometimes referred to as a slicer) is a two-level quantizer (e.g. with possible outputs of −1 and 1).

Figure 2A:
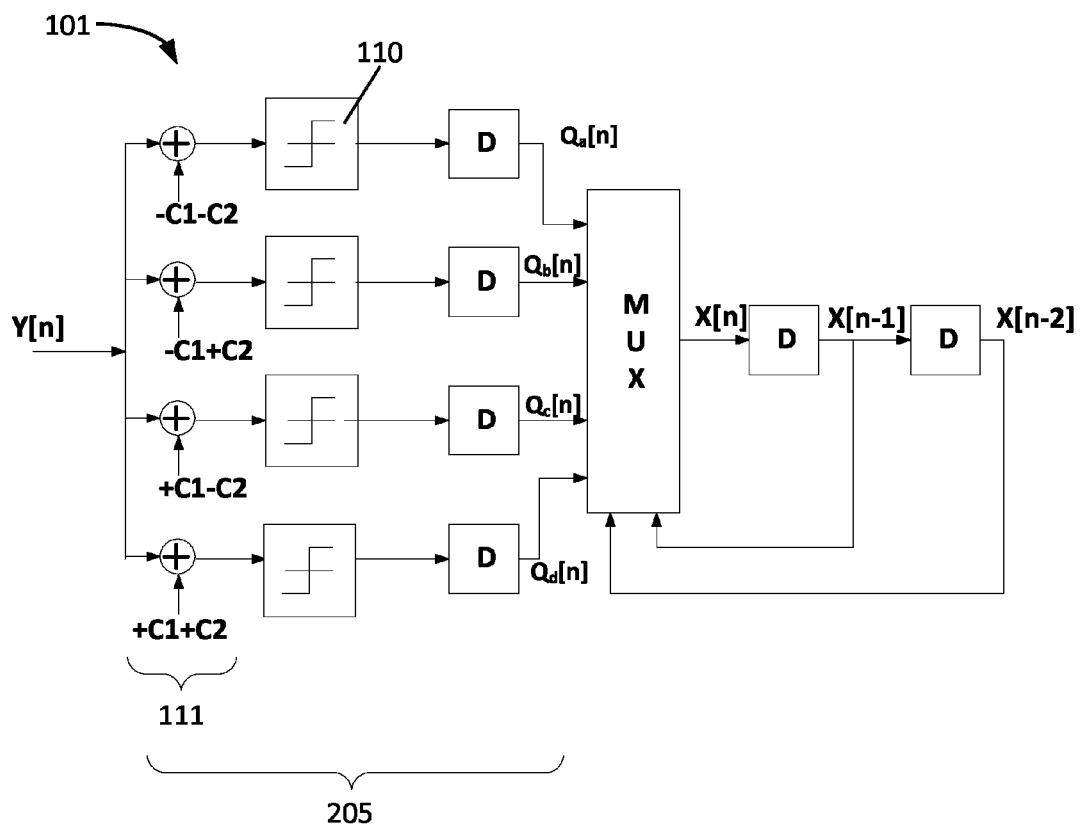

FIG. 2A, shows an example circuit 101 where the circuit 100 of FIG. 1 has been unrolled by precalculating adjusted input values for each possible combination of previous output values X[n−1] and X[n−2] as modified by corresponding coefficient values C1, C2, and selecting the appropriate pre-computed entry based on the actual previous output values X[n−1], X[n−2].

Loop unfolding is an alternative architecture where L levels of look-ahead expansion can be performed on the unrolled architecture to create a parallel architecture. In some examples, this architecture may be suitable for high throughput performance applications.

Figure 2B:
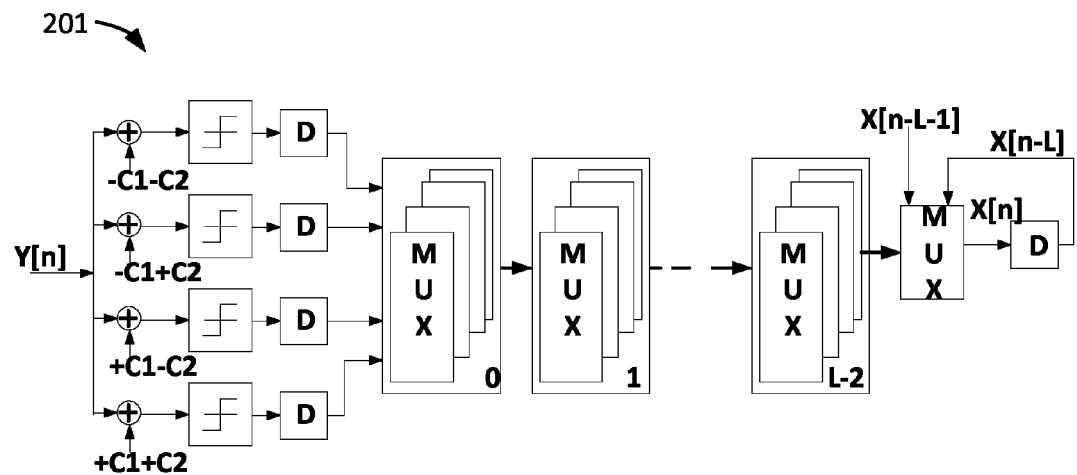

FIG. 2B shows an example of a corresponding L-level unfolded architecture 201 of the DFE system depicted in FIGS. 1 and 2A.

Figure 3:
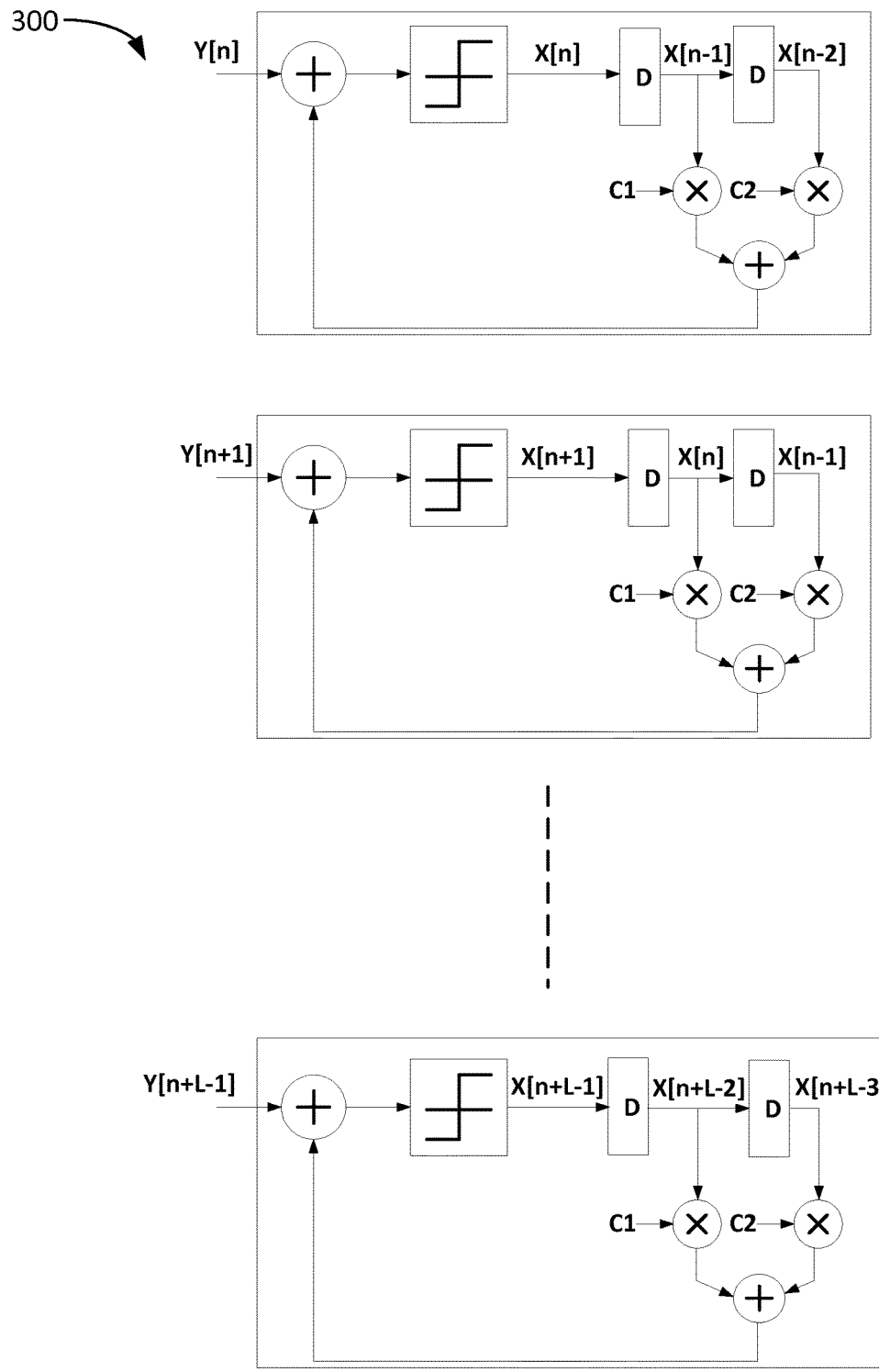
FIGS. 3, 4, 5A and 5B are schematic diagrams showing aspects of example circuits with multiple DFE branches.
Figure 4:
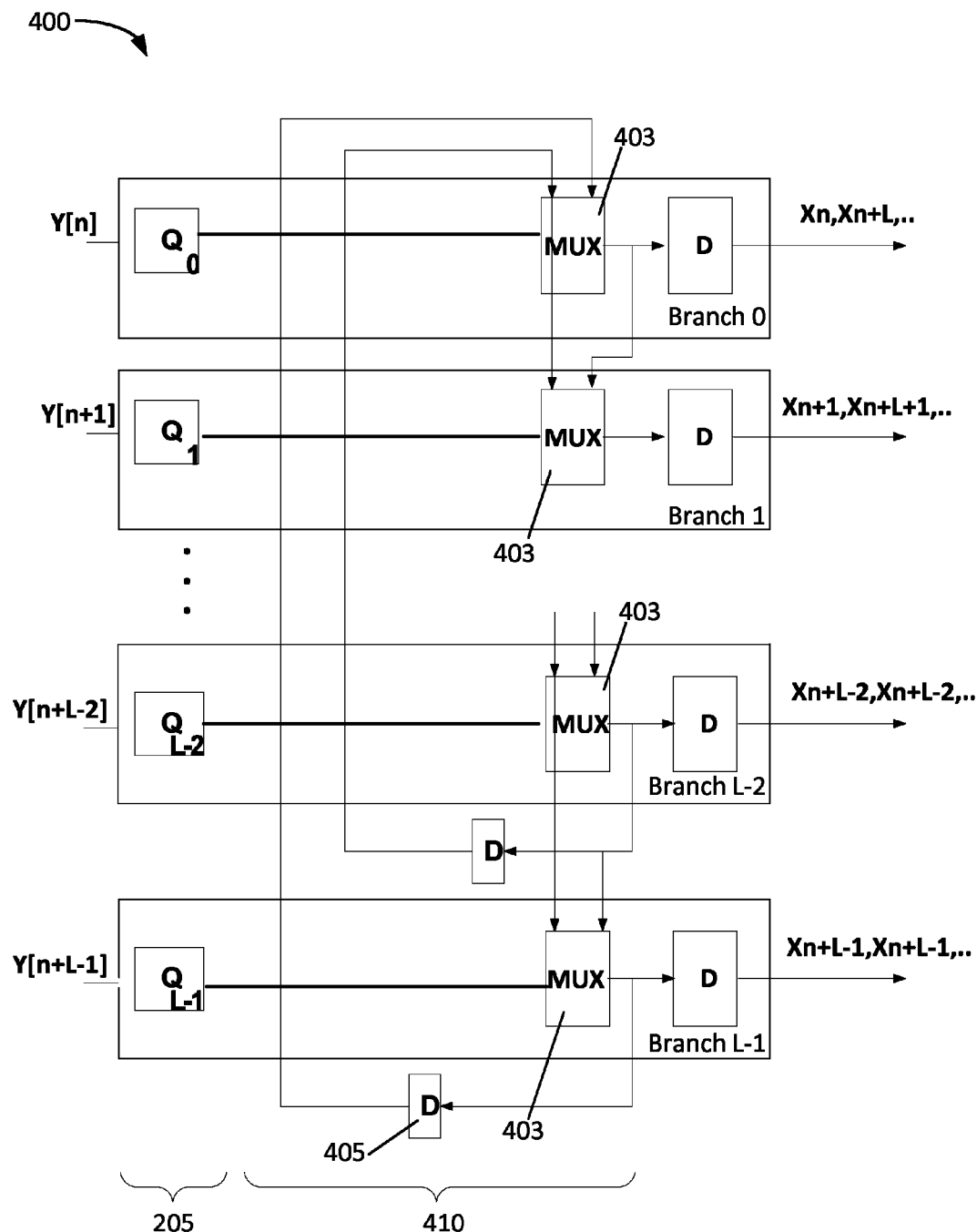

FIG. 3 shows an example circuit 300 for a system having L 2-tap DFE branches operating in parallel. As illustrated in FIG. 4, applying an unrolling technique to the circuit in FIG. 3, each branch in circuit 400 has a multiplexer circuit 410 which, in the example shown in FIG. 4, includes a multiplexer 403. For a single-bit architecture (e.g. non-return to zero or NRZ), the multiplexers 403 may be 4-to-1 MUXs. In a two-bit architecture (e.g. pulse amplitude modulation or PAM-4), the multiplexers 403 may be 16-to-1 MUXs. In contrast to the unfolded circuit (e.g. see FIG. 2B), the unrolled branches do not have a large series of multiplexers. As illustrated in FIG. 4, the output of the multiplexer circuit of an unrolled branch is dependent on the signals at output T=K−1 and T=K−2. For example, the output of Branch 0 is dependent on the outputs of Branch L−1 and Branch L−2. Similarly, the output of Branch 1 is dependent on the outputs of Branch 0 and Branch L−1. Because the output signals of the multiplexer circuits 410 of every branch have to be valid within a single clock period, in some examples, a large parallel circuit 400 may have a long critical path.

The lines in FIG. 4 and any other figure should be understood to represent multiple lines or values where applicable.

For example, in a single clock period, the output of register 405 is a selection input to the MUX of Branch 0. The output of the Branch 0 MUX is a selection input to the Branch 1 MUX whose output is a selection input of the Branch 2 MUX (not shown), etc. This cascading continues until the output of the Branch L−2 MUX is used as a selection input of Branch L−1. In other words, the critical path originating from register 405 goes through every branch's multiplexer circuit (L MUXs in the example in FIG. 4) before the output of Branch L−1 is resolved. In some examples, this timing constraint may limit the operating speed of the circuit as a whole. In some instances, this may be an increasingly important factor when L is large. In some examples, these unrolled branches cannot be easily pipelined.

Figure 5A:
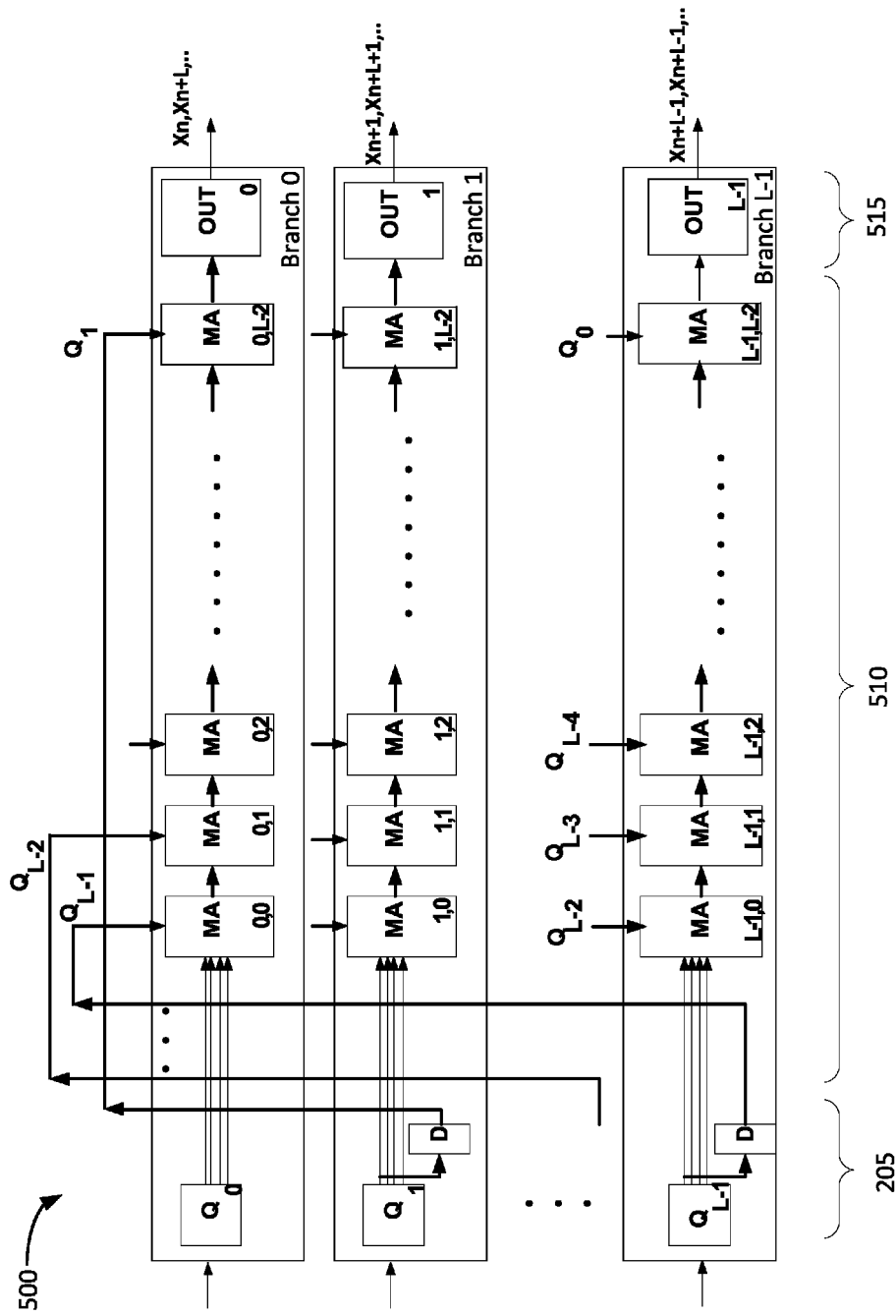

As illustrated in FIG. 5A, applying an unfolding technique to the circuit in FIG. 3, each branch in circuit 500 has a multiplexer circuit 510 including series of multiplexer blocks or arrays (MA). The outputs of the pre-computation stage 205 of each branch are used to control the outputs of the multiplexer circuits of other branches. In FIG. 5A, each unfolded branch has L−1 multiplexers, and output signals from each pre-computation stage 205 propagate through L−1 levels of multiplexer delay before reaching the output block 515. As L increases, the number of multiplexers and the multiplexer delays increase.

Figure 5B:
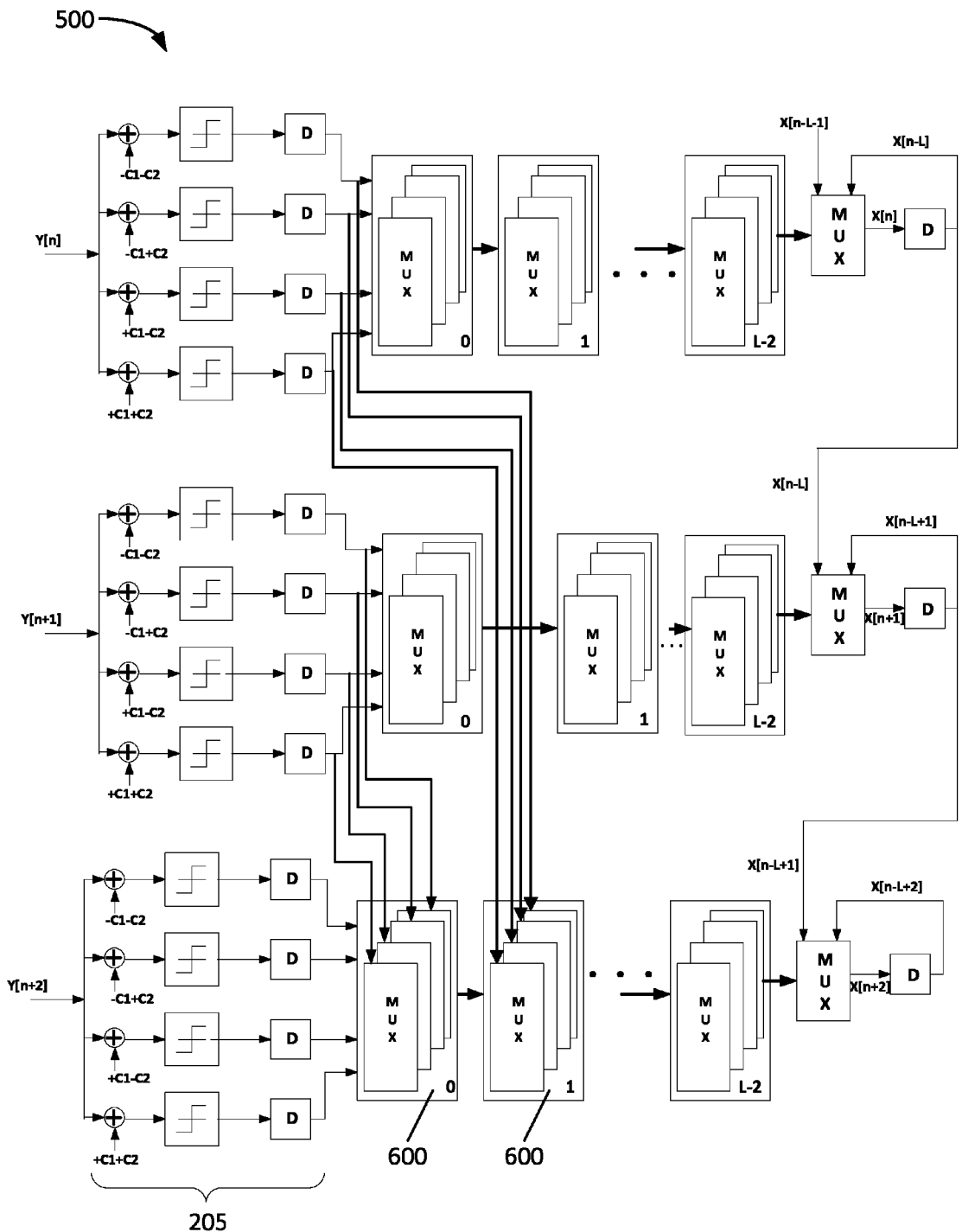

FIG. 5B shows an example unfolded architecture illustrating connections between the quantizer outputs for the pre-computation stages 205 of branches n and n+1 and the selection inputs to the first two multiplexer blocks 600 in the n+2 branch. For clarity, the selection inputs for the other multiplexer blocks have not been shown.

Figure 6A:
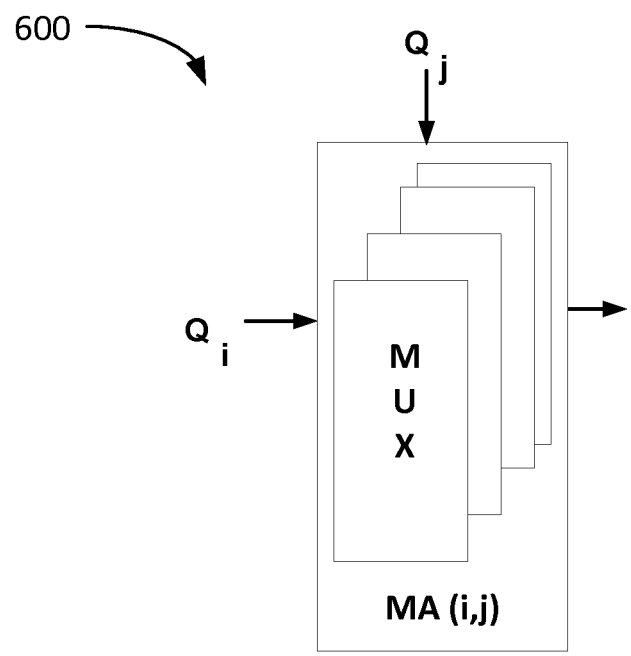
FIG. 6A is a schematic diagram showing aspects of an example multiplexer building block for a DFE branch.

FIG. 6A shows an example circuit of a multiplexer block 600 in the multiplexer circuit of an unfolded branch. The multiplexer block 600 in FIG. 6A selects from inputs based on the tap-adjusted inputs of the $i^{th}$ branch using the tap-adjusted inputs of the $j^{th}$ branch as selectors. Each multiplexer block 600 can include an array of multiplexers, one for each possible combination of tap-adjusted inputs. In some examples, the number of combinations may depend on the number of taps in the circuit architecture. Each multiplexer in a block can have the same $Q_i$ signals as inputs. Each multiplexer in the array can select from the $Q_i$ signals using a different combination of tap-adjusted inputs from $Q_j$.

In some examples, the number of combinations may depend on the number of quantization levels in the circuit architecture.

For example, for a 2-tap architecture with 2 levels of quantization (e.g. −1, +1), $Q_i$ could include four signals for the $i^{th}$ branch as illustrated by the outputs of the pre-computation stage 205 illustrated in FIG. 2A. These four $Q_i$ signals would be inputs to each of four multiplexers in the multiplexer block. The 2 selection inputs for each of the four multiplexers would correspond to a possible combination of the output signals from the pre-computation stage of the $j^{th}$ branch.

Figure 6B:
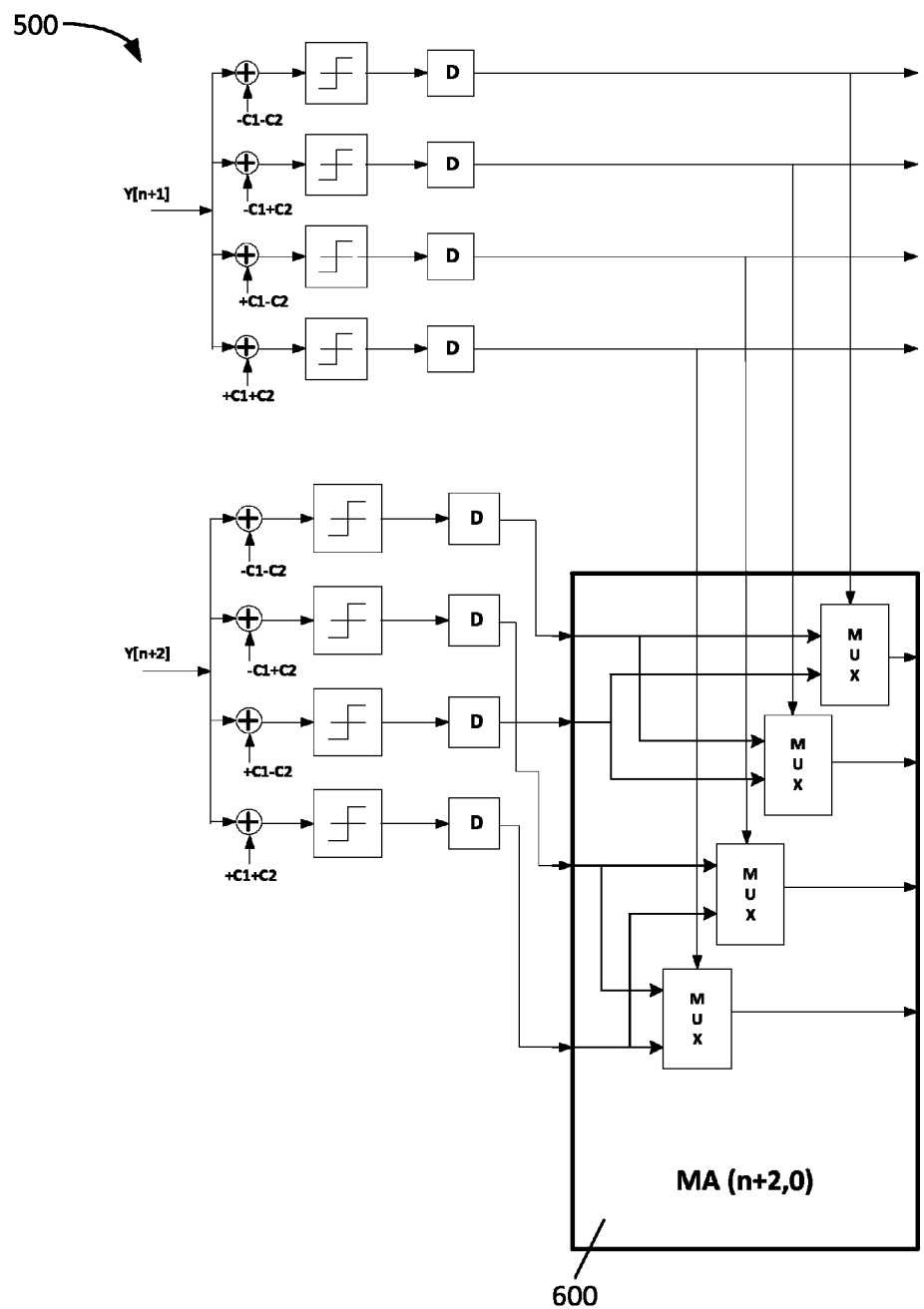
FIG. 6B is a schematic diagram showing aspects of a quantizer and an example multiplexer building block for a DFE branch.

FIG. 6B shows a portion of the example circuit of FIG. 5B including a refined view of the multiplexer array 600. In the example NRZ circuit of FIG. 6B, the MUXs are 2-to-1 multiplexers. In other embodiments, the number and arrangement of multiplexers is adjusted based on the number of taps and the number of quantization levels in the architecture. For example, larger multiplexers and/or additional multiplexers may be used in the multiplexer array 600 for architectures based on a larger number of taps and/or a larger number of quantization levels.

For example, for a PAM4 circuit, the multiplexer array can be implemented with sixteen 4-to-1 multiplexers, i.e. four 4-to-1 MUXs for each 2-bit tap-adjusted input (two MUXs for each bit).

Figure 7:
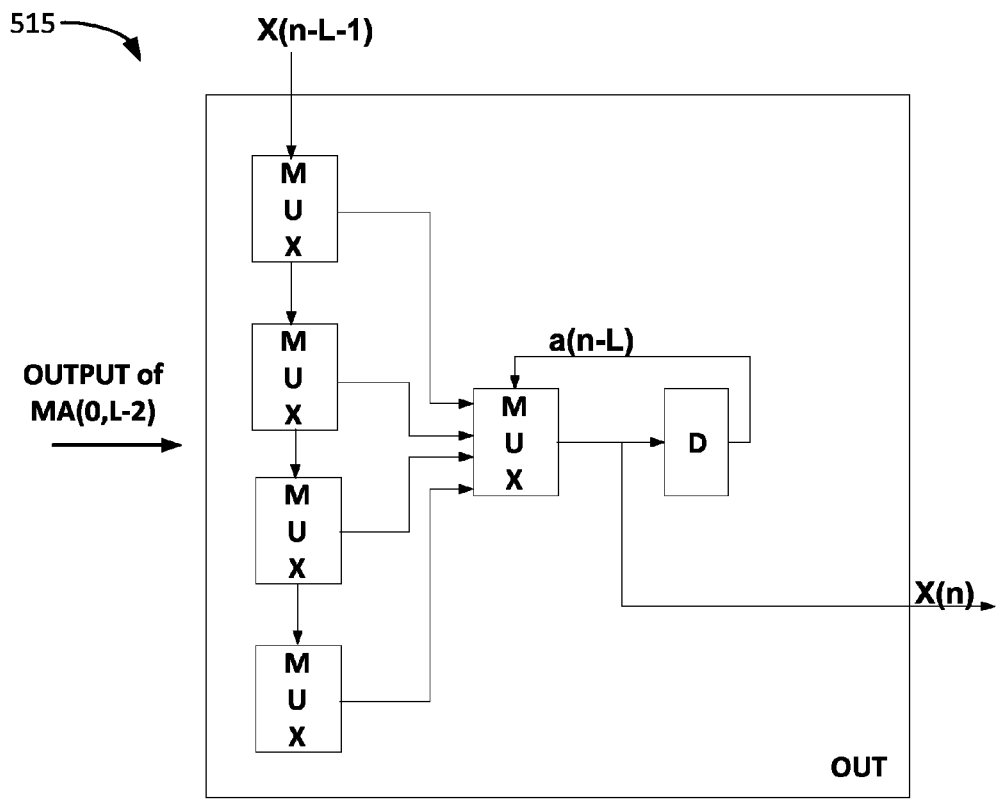
FIG. 7 is a schematic diagram showing aspects of an example building block for a DFE branch.

FIG. 7 shows an example circuit of an output block 515. The output block 515 for each branch can, in some embodiments, be configured to select one of the outputs of the multiplexer circuit 510 based on at least one previous output value. For example, in some embodiments, the DFE branch may be configured to select one of the outputs of the multiplexer circuit 510 based on a previous output of the same branch, such as a(n−L) in FIG. 7. In some embodiments, the DFE branch may be configured to select one of the outputs of the multiplexer circuit 510 based on a previous output as determined from another branch such as X(n−L−1) in FIG. 7. In some embodiments, the DFE branch may be configured to select one of the outputs of the multiplexer circuit 510 based on a combination of previous outputs from the same branch, and previous outputs determined from other branches.

Figure 8:
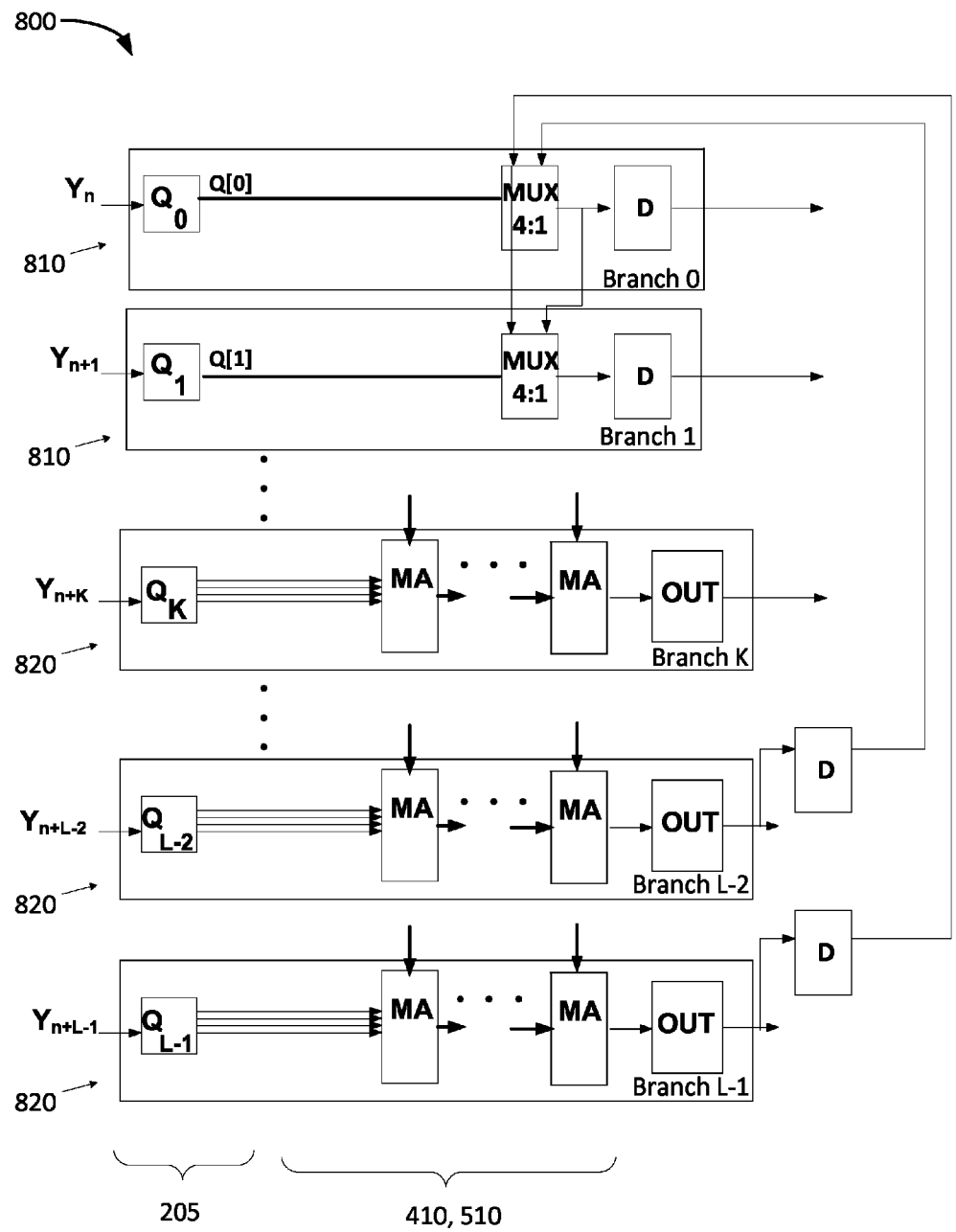
FIGS. 8, 9, 10A, 10B, 10C, and 10D are schematic diagrams showing aspects of example circuits with multiple DFE branches.

FIG. 8 shows an example decision feedback circuit 800 including L N-tap digital feedback equalizer (DFE) branches. The circuit 800 includes a number of unrolled branches 810 (e.g. Branch 0 and Branch 1) and a number of unfolded branches 820 (e.g. Branch K, Branch K+1, Branch L−1). Each branch is configured to determine an output X[i] for an input Y[i]. Although only five full branches are shown in the example in FIG. 8, any suitable number of branches may be included in the circuit 800.

In some embodiments, a decision feedback branch can include a pre-computation stage 205 configured to generate a set of tap-adjusted inputs Q[n]. Each tap-adjusted input Q corresponds to a possible value or set of values for previous outputs of the same DFE branch (e.g. X[n−1], X[n−2]). In some examples, the number of tap-adjusted inputs may depend on the number of taps in the circuit architecture.

In some embodiments, for each output value in the set of possible output values, the pre-computation stage 205 may include a pre-computation circuit 111 configured to add or otherwise adjust an input to the DFE branch Y[n] by one or more pre-computed tap values (e.g. C1, −C1, C2, −C2) associated with the circuit's corresponding previous one or more output values (e.g. +1, −1). The pre-computation stage can also include quantizers 110 configured to quantize outputs from the pre-computation circuits into one of a set of possible output values (e.g. +1, −1). In some embodiments, the set of tap-adjusted inputs corresponds to the set of outputs of the branch's quantizers 110.

These quantizer outputs can, in some examples, represent the quantized value of the current input Y[n] as adjusted by the feedback filter values as determined by the pre-computation circuits 111.

In some embodiments, the tap coefficients (C1, −C1, C2, −C2, etc.) may be based on measured, calculated or otherwise obtained correction factors. In some embodiments, no correction factor may be applied. For example, one or more coefficient values may have a value of one.

For example, in some 2-tap, two-quantization level embodiments, the pre-computation circuits 205 in FIG. 8 may have the structure illustrated in FIG. 2A. Each tap-adjusted input ($Q_a[n]$, $Q_b[n]$, $Q_c[n]$, $Q_d[n]$) corresponds to a set of one or more possible values for previous outputs of the DFE branch ({X[n−1], X[n−2]}={−1, −1}, {−1, +1}, {+1, −1}, {+1, +1}). In other examples, different numbers of tap and/or different numbers of quantization levels may be used.

In some embodiments, each unrolled DFE branch 810 can include a multiplexer circuit 410 configured to select from the branch's set of tap-adjusted inputs. An unrolled branch's multiplexer circuit may include selection lines for selecting from the set of tap-adjusted inputs. In some embodiments, these selection lines can be controlled by outputs from other DFE branches. For example, the 4-to-1 multiplexer for Branch 0 in FIG. 8 has selection lines which are controlled by the outputs of Branch L−2 and Branch L−1.

In some embodiments, the number of selection lines may depend on the number of taps in the circuit 800 architecture. In some embodiments, the number of selection lines may depend on the number of quantization levels for the circuit 800.

In some embodiments, each unfolded DFE branch 820 can include a multiplexer circuit 510 configured to select from the branch's set of tap-adjusted inputs. An unfolded branch's multiplexer circuit may include selection lines for selecting from the branch's set of tap-adjusted inputs. In some examples, these selection lines can be controlled by tap-adjusted inputs of other DFE branches.

In some embodiments, the multiplexer circuit 510 can include a series of multiplexer blocks 600. In some embodiments, each multiplexer block may include selection lines which are controlled by tap-adjusted inputs of a different DFE branch. For example, the multiplexer circuit in Branch L−1 of FIG. 5A includes a series of multiplexer blocks MA. The first multiplexer block has selection lines controlled by the tap-adjusted inputs from the pre-computation stage of Branch L−2 (i.e. the outputs of $Q_{L-2}$). The second multiplexer block has selection lines controlled by the tap-adjusted inputs from the pre-computation stage of Branch L−3 (i.e. the outputs of $Q_{L-3}$), etc.

In some embodiments, the multiplexer circuit 510 includes selection lines controlled by the tap-adjusted inputs from every other branch. For example, Branch L−1 of FIG. 5A includes selection lines controlled by each tap-adjusted input from every branch from Branch 0 to Branch L−2.

In some embodiments, a multiplexer circuit 410, 510 can include a series of multiplexers such as the 4-to-1 multiplexers illustrated, for example, in FIG. 8, or multiplexer blocks such as multiple 2-to-1 multiplexers as would be used, for example, in FIG. 6B. In some embodiments, the multiplexer circuit may include individual multiplexer components (as illustrated for example by the individual MUX units in the figures) and/or a combination of gates or logic circuitry suitable for performing one or more selections, or some combination thereof.

While the multiplexer circuits in some of the figures have been illustrated as individual 16-to-1 or 4-to-1 MUX units, in some embodiments and where applicable, the multiplexer circuits may be created similarly through the use of smaller or larger MUXs (e.g. 2-to-1, 8-to-1, 32-to-1, etc.) or corresponding logic gates/circuitry.

The circuit 800 can include a combination of unrolled branches and unfolded branches in different orders, arrangements or configurations as described herein.

For example, as illustrated in FIG. 8, in some embodiments, the DFE branches 810, 820 of the circuit 800 can be ordered, arranged or otherwise designed such that at least one of the unfolded DFE branches 820 is positioned after at least one of the unrolled DFE branches 810. In some examples, one or more unfolded DFE branch(es) 820 can be arranged such that the output of at least one unrolled DFE branch 810 is used as a selector in the one or more unfolded DFE branch(es). For example, in the example circuit in FIG. 9 the output 910 of unrolled Branch 2 is used as a selector in unfolded Branch 3.

In some embodiments, the DFE branches 810, 820 are ordered, arranged or otherwise designed such that at least one unfolded DFE branch 820 is configured to evaluate the output X[n] for input Y[n], and an unrolled DFE branch 810 is configured to evaluate the output X[n−1] for input Y[n−1] (i.e. is a previous parallel branch in the logical sequence of parallel branches).

In some embodiments, the DFE branches 810, 820 can be ordered, arranged or otherwise designed such that at least one of the unrolled DFE branches 810 is positioned after at least one of the unfolded DFE branches 820. In some examples, such an architecture can be arranged such that one or more unrolled DFE branches immediately following one or more unfolded DFE branches have MUX selection inputs which only depend from the outputs of the preceding one or more unfolded DFE branches. In some examples, the outputs of the unrolled DFE branches positioned after the unfolded DFE branches will not depend from the outputs of any unrolled DFE branches preceding the unfolded DFE branches.

Figure 9:
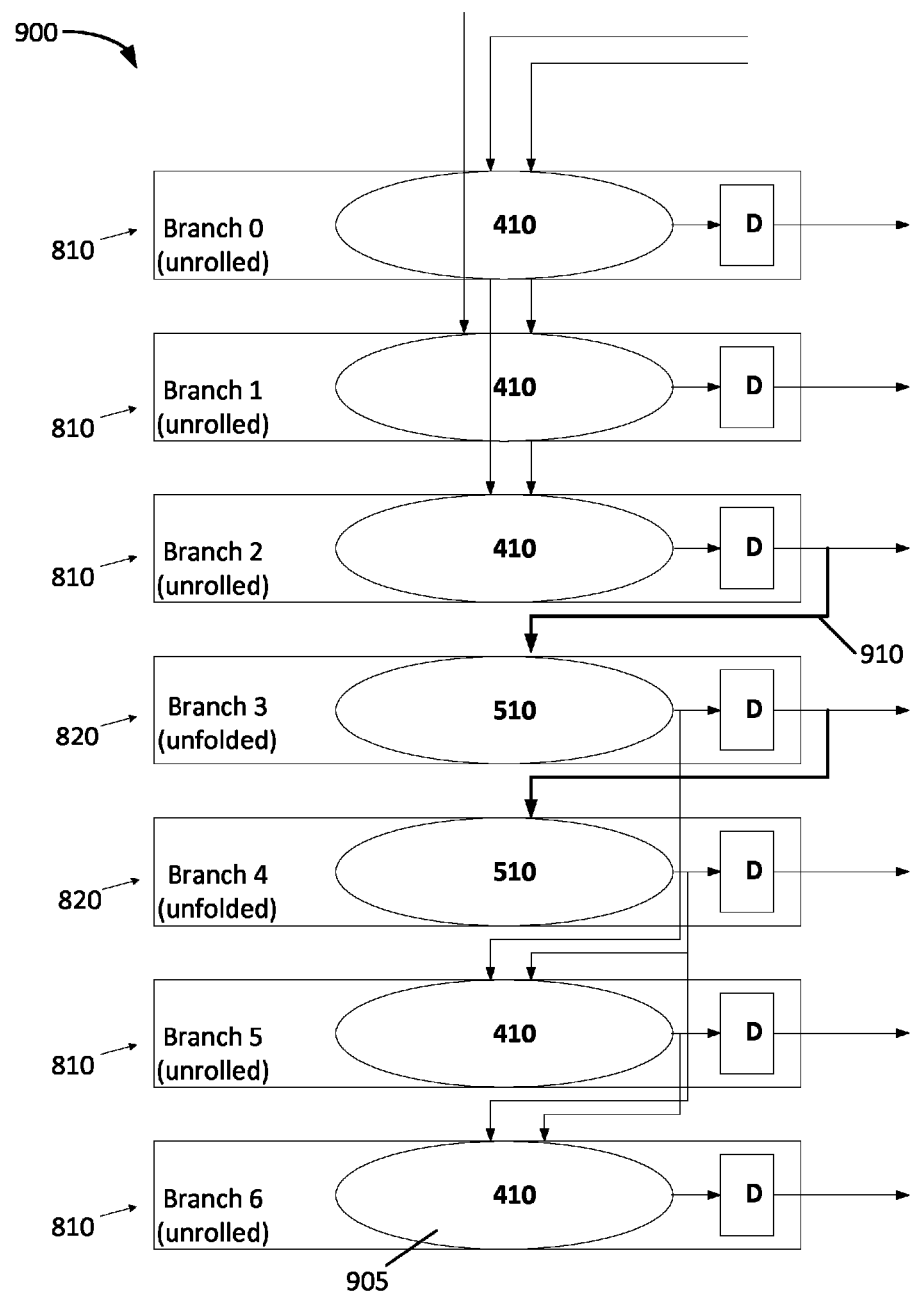

FIG. 9 shows an example circuit 900 having a 2-tap architecture with L=7 levels. In circuit 900, the first three unrolled branches (Branch 0, Branch 1, and Branch 2) are followed by two unfolded branches (Branch 3 and Branch 4), which in turn are followed by two more unrolled branches (Branch 5 and Branch 6). In other words, in some embodiments, at least one unfolded branch 820 can be positioned between two or more unrolled branches 810.

Generally, in some embodiments, hybrid architectures including unrolled and unfolded branches may enable input to output signals of an N-tap DFE circuit to propagate through shorter delay paths compared to conventional unfolded designs. In some embodiments, the circuits described herein may enable pipeline registers to be inserted into the circuit to split long delay paths through L−1 levels of MUXs into paths with smaller delays.

In some embodiments, the circuits described herein may require smaller logic resource usage, and in some examples, may enable high speed performance for N-tap DFE circuits. The hybrid architectures may, in some instances, allow for a greater number of taps and/or parallel feedback filter branches in a circuit design.

As illustrated in FIG. 8, in some embodiments, the DFE branches of a circuit 800 may be configured such that unrolled branches 810 are arranged on the first K rows of the architecture, followed by L–K unfolded branches 820. In some embodiments, as the number of branches L increases, additional sets of unrolled and unfolded branches may be cascaded after a first set of unrolled branches and a first set of unfolded branches.

In some embodiments, as illustrated in FIG. 9, the DFE branches may be cascaded or may be arranged to alternate between sets of one or more unrolled branches and sets of one or more unfolded branches. The number of branches in each set and the number of sets may vary based on the total number of branches L and other factors. For example, in some instances, designs with a greater number of unfolded branches may require a larger circuit/design/chip area due to their relatively large multiplexer circuits. In some instances, having a larger number of unrolled branches between unfolded branches may increase the critical path from the branch inputs to the branch outputs, thereby potentially limiting the speed of the circuit.

Based on any of the embodiments described herein, in some examples, the unfolded branches can serve as pipeline stages to enable the circuit to split long delay paths, instead of using a larger number of stages of unrolled branches. In some examples, the unfolded branches may split or otherwise shorten a critical path for the output of at least one DFE branch.

In some embodiments, the unfolded branches may include one or more registers or other storage elements for a pipeline stage or for otherwise allowing for pipelining of the decision feedback circuit. In some example embodiments, the one or more registers or other storage elements may split a critical path for the output of at least one of the DFE branch.

In the example circuit 900 of FIG. 9, the circuit architecture includes three sets of unrolled and unfolded branches. The insertion of a set of unfolded branches (Branches 3 and 4) into the architecture can enable the circuit to be pipelined to split long delay paths into shorter paths. A first delay path propagates from the inputs of Branch 0 through the combinational logic of Branches 1 and 2 (multiplexer circuits, etc.), and ends at the register of Branch 2. A second delay path propagates from the inputs of Branch 3 through the combinational logic of Branches 3, 5 and 6, and ends at the register of Branch 6.

In some embodiments, the current output of an unrolled branch may depend on the outputs of the multiplexer circuits of only those unrolled branches which are between the current unrolled branch and a set of unfolded branches in the series of DFE branches. For example, the current output of Branch 6 depends on unrolled Branch 5 and unfolded Branches 3 and 4, but not from Branches 0-2. In other words, in some embodiments, the current output of an unrolled branch may not depend on the output of any unrolled branch which is separated from the current branch by a set of one or more unfolded branches. Stated differently, in some examples, the current output of an unrolled branch may depend only on the outputs of unrolled branches which are not separated from the current branch by a set of one or more unfolded branches.

Had the circuit 900 of FIG. 9 been implemented using 7 unrolled branches (as described in the example of FIG. 4), the critical circuit delay would equal 7 levels of MUX circuit delays. Such an architecture may use fewer logic resources but has a long critical path and cannot be reasonably pipelined. Similarly, if the circuit 900 of FIG. 9 was implemented using 7 unfolded branches (as described in the example of FIG. 5A), the critical circuit delay would equal 6 levels of MUX circuit delays. Such an architecture could be pipelined, but may require a large amount of logic resources.

In contrast, in the circuit 900 of FIG. 9, the delay path for the output of Branch 2 would equal three levels of MUX delays i.e. the MUX delays through the MUX circuits of Branches 0, 1 and 2. The delay path for the output of Branch 6 would equal eight levels of MUX delays i.e. six MUXs through the MUX circuit in unfolded Branch 3, and two single MUX delays through the MUX circuits Branches 5 and 6. In some examples, this architecture is smaller than an architecture having 7 unfolded branches and can be pipelined to further reduce the critical path such that it is faster than the architecture having 7 unrolled branches. Pipelining is described below with reference to FIGS. 10C and 10D.

As described above, the circuit 900 of FIG. 9 with the hybrid architecture including both unrolled and unfolded branches can enable the circuit to be pipelined to split the critical path into two or more shorted delay paths. In some embodiments, this may increase the speed of the circuit, and/or may increase the ability to design a highly parallel circuit 900 with a large number of branches L. In some embodiments, this may increase the throughput of the circuit 900.

In some embodiments, the additional opportunities for pipelining the circuit may increase the speed and/or throughput of the circuit.

Figure 10A:
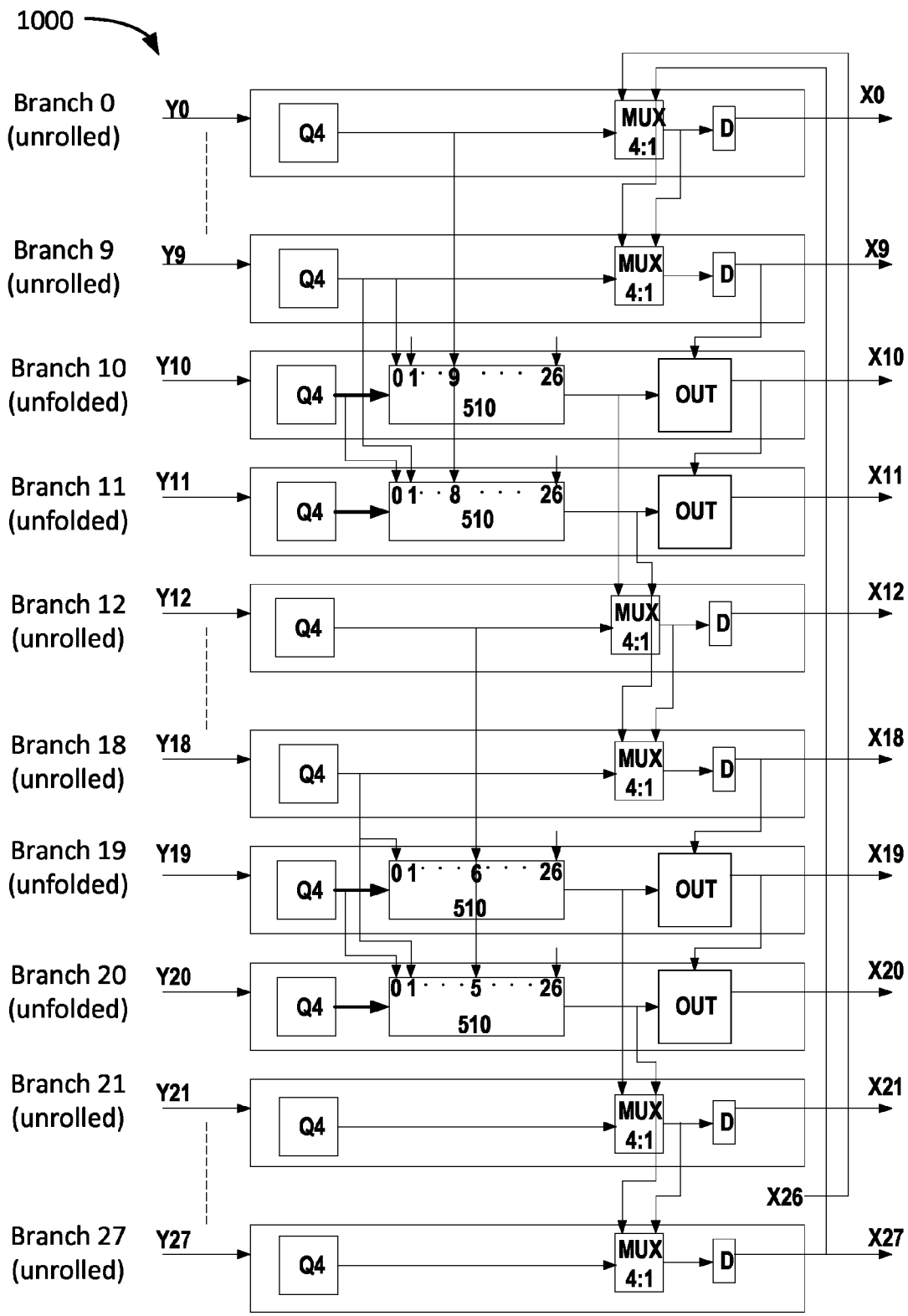

FIG. 10A shows aspects of an example 2-tap circuit 1000 having L=28 levels. In the example circuit 1000, the branches alternate between sets of unrolled branches and sets of unfolded branches. In this example circuit, there are three sets of unrolled branches (Branches 0-9, 12-18, 21-27), and two sets of unfolded branches (Branches 10-11, 19-20). The insertion of the sets of unfolded branches may split the critical path through the 4-to-1 MUXs in the unrolled branches into shorter paths.

In the example unrolled architecture in FIG. 4, for a circuit 400 with 28 branches, the delay path starts at the register 405 and traverses through 28 levels of MUXs.

Figure 10B:
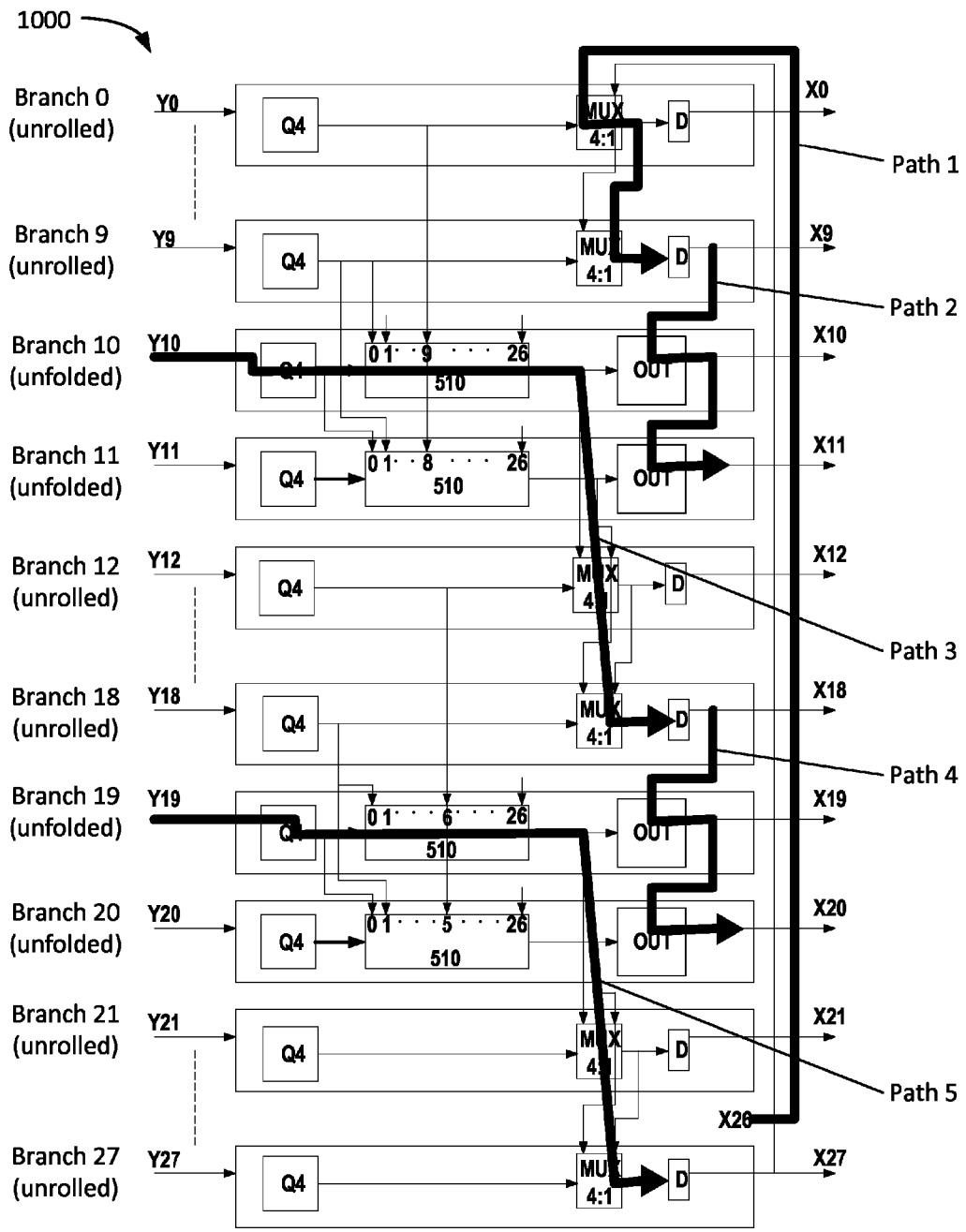

In contrast, the example hybrid unrolled-unfolded architecture in FIG. 10A splits or otherwise has shorter delay paths. For example, FIG. 10B illustrates a number of example delay paths for the unrolled-unfolded architecture of FIG. 10A. Path 1 starts from the outputs X26 and X27, and traverses ten multiplexers in Branches 0 through 9. Path 2 starts from the output X9 and traverses two output blocks 515 (in Branches 10 and 11). Path 3 starts from the inputs of Y10 and Y11 and traverses through seven multiplexers (in Branches 12 through 18). Path 4 starts from the output X18 and traverses two output blocks (in Branches 19 and 20). Path 5 starts from the inputs Y19 and Y20 and traverses through seven multiplexers (in Branches 21 through 27).

As illustrated by these delay paths, an unrolled-unfolded architecture can, in some embodiments, have shorter critical paths than a fully unrolled architecture and can result in a faster circuit.

Figure 10C:
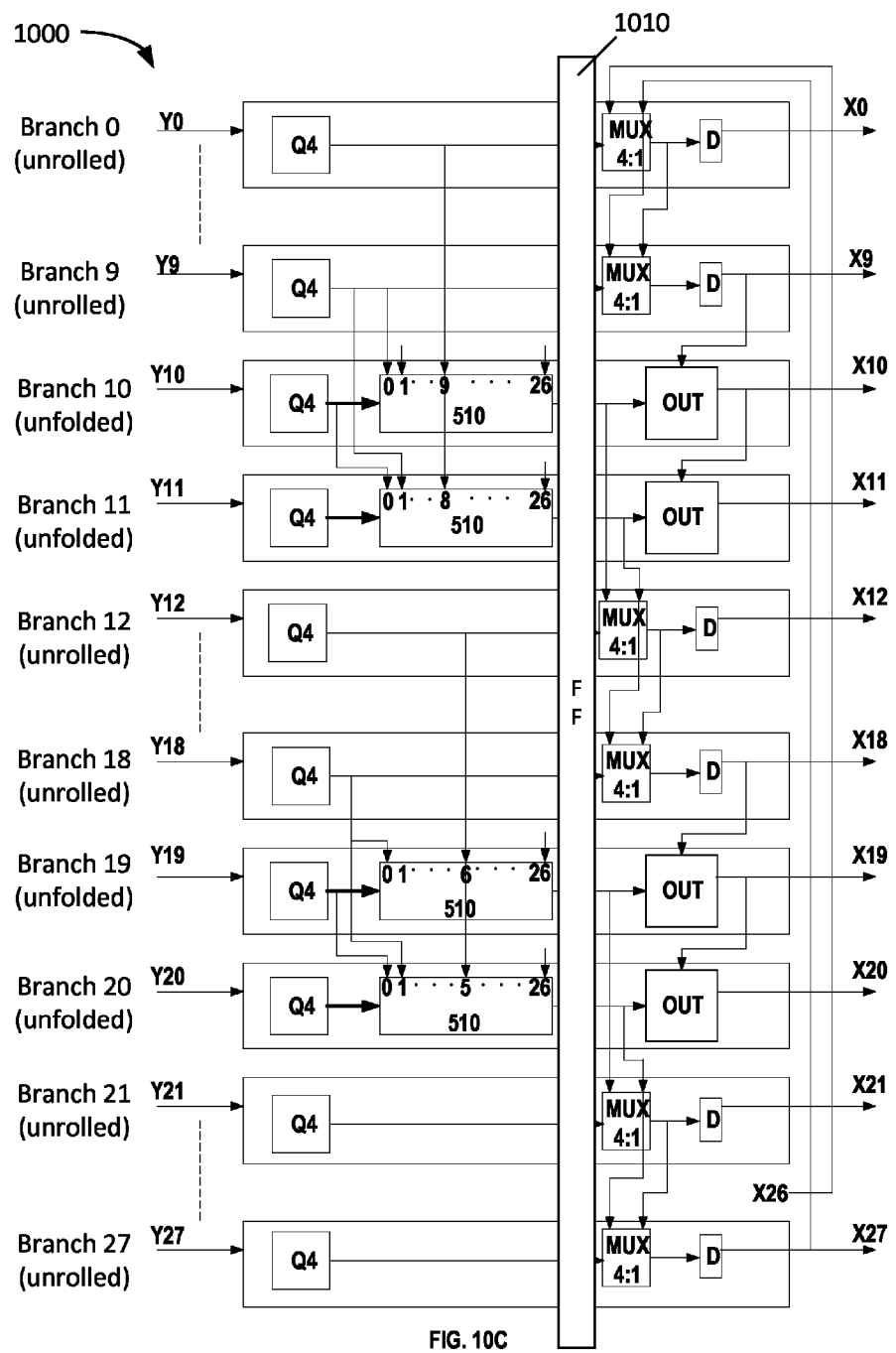

In some embodiments, the unfolded branches in an unrolled-unfolded architecture may allow the circuit 1000 to be pipelined. For example, FIG. 10C shows the example circuit of FIG. 10A with the addition of a stage of storage elements 1010 for pipelining the circuit 1000. The storage elements may be flip-flops, latches, registers, or any other suitable storage element for pipelining. These storage elements 1010 may break the delay path of the unfolded branches (Branches 10, 11, 19 and 20) into two shorter delay paths.

Figure 10D:
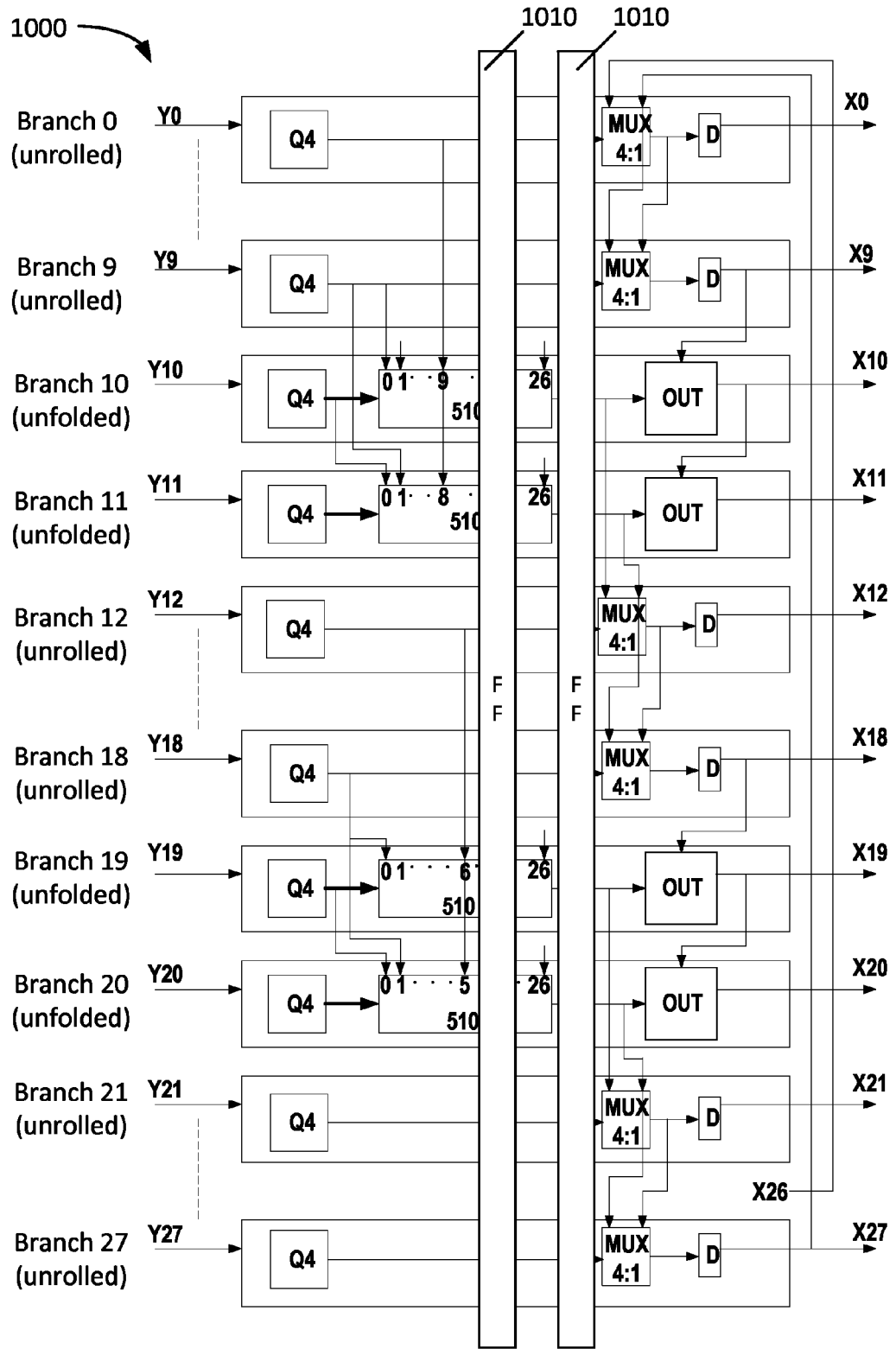

FIG. 10D shows another example circuit 1000 in which two stages of storage elements 1010 have been inserted to introduce an additional pipeline stage to break up the long delay path through the multiplexer circuit 510.

While a fully unfolded architecture as illustrated in FIG. 5B may also be pipelined, it utilizes a large amount of chip area and logic (i.e. L−1 levels of MUXs for each branch).

In some embodiments, the unrolled-unfolded circuits may provide a circuit which is faster than a fully unrolled circuit, and smaller than a fully unfolded architecture.

In some embodiments, different numbers of sets, and different numbers of branches in each set may be used. For example, depending on design parameters or constraints (e.g. size, speed, technology, etc.), additional sets of unfolded branches may be used and/or more than two unfolded branches may be in each set. The number of branches in each set (i.e. the number of logically adjacent/consecutive branches in each set) can be varied, and can differ between sets irrespective of whether they are sets of unrolled branches or unfolded branches.

In some examples, the trade-offs between the number of unfolded and unrolled branches in the circuit and their arrangement may be based on a desired size, speed and/or throughput (e.g. number of parallel branches L) for the circuit.

For example, a variant of the circuit 1000 in FIG. 10A may include fewer unrolled branches by increasing the number of unfolded branch sets and/or increasing the number of unfolded branches in each set. In some examples, this may shorten the length of the critical path while potentially increasing the size of the circuit.

Conversely, a variant of the circuit 1000 in FIG. 10A may include fewer unfolded branches in the circuit by increasing the number of unrolled branch sets and/or increasing the number of unrolled branches in each set. In some examples, this may increase the length of the critical path but may reduce the size of the circuit.

In any of the example embodiments described herein, the number of unfolded branches in a set (i.e. branches which are logically adjacent) may depend on the number of taps in the architecture. Since, in some instances, the output of a branch in an N-Tap architecture may depend on selection inputs from N previous branches, in order to fully divide long critical paths from cascading through the levels of multiplexer circuits in the unrolled branches, a minimum of N unfolded branches may be needed in a set of unfolded branches. In other words, in some embodiments, the number of branches in a set of unfolded branches may be equal to or greater than the number of taps in the circuit architecture.

In some embodiments, one or more of the DFE branches may loop back on earlier branches in the circuit. For example, with reference to FIG. 10A, the outputs of Branches 26 and 27 loop back to selection inputs of the MUXs in Branches 0 and 1. In some examples, the ordering of unfolded and unrolled branches may be configured to shorten the critical paths between these branches.

In the examples above, the figures show circuits having 2-tap architectures. However, in other embodiments, the decision feedback circuits described herein may utilize a single-tap (1-tap) architecture, or other numbers of taps (3-tap, 4-tap, etc.). Despite the improved signal fidelity/accuracy of higher-tap architectures, single-tap architectures are commonly used because they have simpler designs, may perform faster and/or may require less hardware. In some embodiments, the hybrid unrolled-unfolded circuits described herein may be used for single-tap (1-tap) architectures. However, in other embodiments, the hybrid circuits described herein may allow for 2- or higher-tap architectures to be feasible from a speed, size, practical and/or cost standpoint. In some instances, a 2- or higher-tap hybrid architecture may reduce or eliminate error correction requirements for a system.

Simulations have shown that use of a hybrid unrolled-unfolded architecture for a 2-tap, 28-level decision feedback circuit with 10 unrolled and 18 unfolded architecture is faster than a similar circuit having only unrolled branches, and has lower gate counts than a similar circuit having only unfolded branches.

While the examples above show decision feedback circuits based on two quantization levels (e.g. +1. −1), aspects of the present disclosure may also apply to circuits having 2 or more quantization levels. For example, the circuit may have $2^A$ (e.g. 2, 4, 8, or 16) levels of quantization, where A is a positive integer.

While the example circuits in the figures above show non-return to zero (NRZ) architectures, aspects of the present disclosure may also apply to PAM-4 (pulse amplitude modulation) architectures (e.g. architectures with 2-bit inputs signals rather than the 1-bit signals for NRZ).

In some embodiments, example circuits described herein may be part of larger electronic devices. For example, a decision feedback circuit 800, 900, 1000 may be part of a larger circuit, such as a serializer/deserializer device. In some examples, a decision feedback circuit 800, 900, 1000 may be part of an interface for a communication channel. For example, a decision feedback circuit 800, 900, 1000 may be part of an interface between two chips, devices, etc.

In some embodiments, circuits based on the examples described herein may be part of an equalizer device, a receiver device, or an interface portion of a larger device having another purpose.

Figure 11:
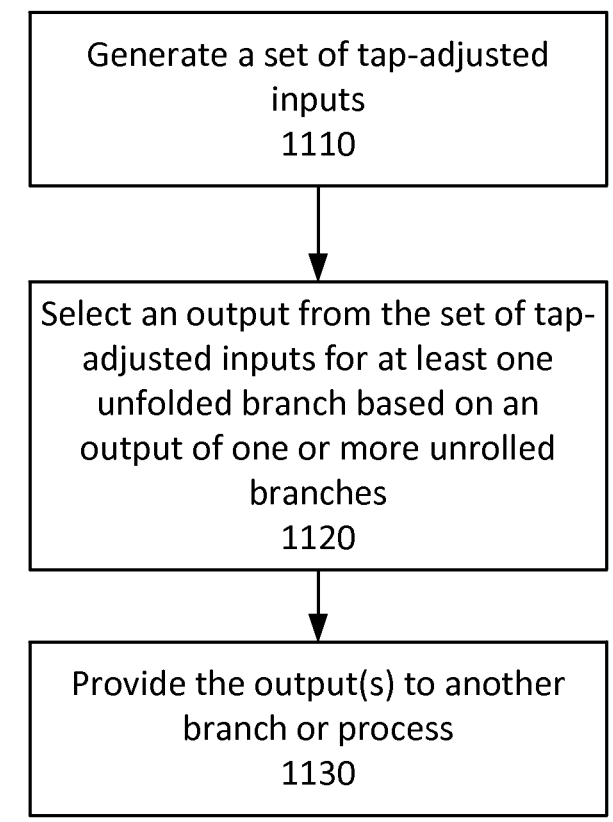
FIG. 11 is a flowchart showing aspects of an example method for decision feedback equalization.

FIG. 11 shows a flowchart showing aspects of an example method for decision feedback equalization. At 1110, a circuit or device generates a set of tap-adjusted inputs for each decision feedback equalizer (DFE) branch in a decision feedback circuit.

For each branch, the circuit or device selects at least one output from the sets of tap-adjusted inputs using a combination of unrolled and unfolded DFE branches.

At 1130, the selected output(s) can be provided to another branch of the decision feedback circuit or another device or process for which the outputs are intended.

In some embodiments, selecting 1120 the output(s) from the set of tap-adjusted inputs for at least one of the unfolded branches can be based on the output of one or more unrolled branch(es).

In some embodiments, selecting the output(s) from the set of tap-adjusted inputs for at least one of the unfolded branches can be based on multiplexer circuit output(s) of at least one unfolded branch. In some examples, when the circuit is an N-tap circuit, selecting the output(s) from the set of tap-adjusted inputs for at least one of the unfolded branches can be based on multiplexer circuit outputs of N previous unfolded branches.

In some embodiments, selecting the output(s) from the set of tap-adjusted inputs for at least one of the unrolled branches can be based on the multiplexer circuit output(s) of other unrolled branches which are not separated from the unrolled branches by one or more unfolded branch(es).

In some embodiments, the process of selecting the output(s) from the set of tap-adjusted inputs for each of the DFE branches can be pipelined using a pipeline stage provided by one or more unfolded branch(es).

Various example embodiments are described herein. Although each example embodiment describes a single combination of elements, all possible combinations of the disclosed elements are contemplated by the present disclosure. For example, if one embodiment comprises elements A, B, and C, and a second embodiment comprises elements B and D, then the present disclosure contemplates all other remaining combinations of A, B, C, or D, even if not explicitly disclosed.

Although the present invention and its potential advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A decision feedback circuit comprising:
    L N-tap decision feedback equalizer (DFE) branches including: K unrolled DFE branches, and L–K unfolded DFE branches;
    each DFE branch including a pre-computation circuit configured to generate a set of tap-adjusted inputs, each tap-adjusted input corresponding to a possible value for at least one previous output of the same DFE branch;
    each unrolled DFE branch including a multiplexer circuit having selection lines for selecting from the set of tap-adjusted inputs for the unrolled DFE branch, the selection lines being connected to outputs of other DFE branches; and
    each unfolded DFE branch including an unfolded branch multiplexer circuit configured to select at least one output from the set of tap-adjusted inputs, the unfolded branch multiplexer circuit comprising a plurality of multiplexer blocks, each multiplexer block having selection lines corresponding to tap-adjusted inputs from a different one of the other DFE branches.

2. The decision feedback circuit of claim 1, wherein the L DFE branches are ordered such that the selection from the set of tap-adjusted inputs of at least one unfolded DFE branch is based on at least one output of at least one of the unrolled branches.

3. The decision feedback circuit of claim 1, wherein inputs to the selection lines for at least one of the unrolled DFE branches depend on outputs of previous unrolled branches which are not separated from the at least one of the unrolled DFE branches by at least one unfolded branch.

4. The decision feedback circuit of claim 1, wherein the L DFE branches are ordered such that at least one of the L–K unfolded DFE branches is positioned after at least one of the K unrolled DFE branches.

5. The decision feedback circuit of claim 1, wherein the L DFE branches are ordered such that at least one of the L–K unfolded DFE branches is positioned between two of the K unrolled DFE branches.

6. The decision feedback circuit of claim 1, wherein the L DFE branches are ordered to alternate between sets of unfolded DFE branches and unrolled DFE branches.

7. The decision feedback circuit of claim 6, wherein at least one set of unrolled DFE branches includes at least N unrolled DFE branches, where N is a number of taps in the decision feedback circuit.

8. The decision feedback circuit of claim 1, wherein the unfolded branch multiplexer circuit of each unfolded DFE branch comprises L–1 multiplexer blocks, the selection lines of each of the multiplexer blocks corresponding to the tap-adjusting inputs from one of the other DFE branches.

9. The decision feedback circuit of claim 1, wherein the multiplexer circuit of each unrolled branch comprises a $2^N$-to-one multiplexer circuit, the selection lines being connected to outputs of the previous N branches of the other DFE branches.

10. The decision feedback circuit of claim 1, wherein the pre-computation circuit comprises: for each of the set of tap-adjusted inputs:
    a computation circuit configured to adjust an input to the DFE branch by at least one pre-computed tap value associated with the corresponding at least one possible value for the at least one previous output of the same DFE branch; and
    a quantizer configured to quantize an output from the computation circuit into one of a set of possible output values to provide a tap-adjusted input in the set of tap-adjusted inputs.

11. The decision feedback circuit of claim 1, wherein at least one of the L–K unfolded DFE branches is pipelined and splits a critical path for at least one output of the L DFE branches.

12. The decision feedback circuit of claim 1, wherein at least one of the L–K unfolded DFE branches is pipelined and splits a critical path between at least two of the K unrolled DFE branches.

13. The decision feedback circuit of claim 1, wherein at least one of the L–K unfolded DFE branches comprises at least one storage element for a pipeline stage of the decision feedback circuit.

14. The decision feedback circuit of claim 1, wherein at least one of the L–K unfolded DFE branches comprises at least one storage element which splits a critical path for at least one output of the L DFE branches.

15. The decision feedback circuit of claim 1, wherein the plurality of DFE branches are 2-Tap decision feedback equalizers.

16. The decision feedback circuit of claim 1, wherein the decision feedback circuit is a circuit having $2^A$ levels of quantization, where A is a positive integer.

17. A method for decision feedback equalization, the method comprising:
    generating a set of tap-adjusted inputs for each of a plurality of decision feedback equalizer (DFE) branches in a decision feedback circuit including a plurality of unrolled DFE branches and a set of one or more unfolded DFE branches; and
    selecting at least one output from the set of tap-adjusted inputs for at least one unfolded DFE branch in the set of unfolded DFE branches based on an output of at least one of the plurality of unrolled DFE branches and based on selection lines corresponding to the sets of tap-adjusted inputs from a plurality of other DFE branches.

18. The method of claim 17 comprising selecting at least one output from the set of tap-adjusted inputs for at least one of the plurality of unrolled DFE branches based on a multiplexer circuit output of at least one unfolded DFE branch in the set of unfolded DFE branches.

19. The method of claim 18, wherein the decision feedback circuit is an N-tap circuit, and wherein selecting the at least one output from the set of tap-adjusted inputs for at least one of the plurality of unrolled DFE branches is based on multiplexer circuit outputs of N previous unfolded DFE branches in the set of unfolded DFE branches.

20. The method of claim 17 comprising selecting the at least one output from the set of tap-adjusted inputs for at least one of the plurality of unrolled DFE branches based on multiplexer circuit outputs of previous unrolled DFE branches of the plurality of unrolled DFE branches which are not separated from the at least one unrolled DFE branch by at least one unfolded DFE branch in the set of unfolded DFE branches.

21. The method of claim 17 wherein selecting the at least one output from the set of tap-adjusted inputs for at least one of the plurality of DFE branches is pipelined using a pipeline stage provided by at least one unfolded DFE branch in the set of unfolded DFE branches.

22. The method of claim 17 wherein generating the set of tap-adjusting inputs for each of the plurality of DFE branches comprises:
for each possible output value from a set of possible output values:
adjusting an input to the at least one branch of the plurality of DFE branches by a pre-computed tap value associated with the corresponding possible output value; and
quantizing the adjusted input into one of the set of possible output values to provide a tap-adjusted input in the set of tap-adjusted inputs.

23. An electronic device comprising:
L N-tap decision feedback equalizer (DFE) branches including: K unrolled DFE branches, and L−K unfolded DFE branches;
each DFE branch including a pre-computation circuit configured to generate a set of tap-adjusted inputs, each tap-adjusted input corresponding to a possible value for at least one previous output of the same DFE branch;
each unrolled DFE branch including a multiplexer circuit having selection lines for selecting from the set of tap-adjusted inputs for the unrolled DFE branch, the selection lines being connected to outputs of other DFE branches; and
each unfolded DFE branch including an unfolded branch multiplexer circuit configured to select at least one output from the set of tap-adjusted inputs, the unfolded branch multiplexer circuit comprising a plurality of multiplexer blocks, each multiplexer block having selection lines corresponding to tap-adjusted inputs from a different one of the other DFE branches.

* * * * *